(12) United States Patent
Kikuzuki

(10) Patent No.: US 9,414,312 B2
(45) Date of Patent: Aug. 9, 2016

(54) COMMUNICATION DEVICE AND METHOD FOR PACKET COMMUNICATIONS IN A CONTENTION-FREE PERIOD

(71) Applicant: FUJITSU LIMITED, Kawasaki-shi, Kanagawa (JP)

(72) Inventor: Tatsuya Kikuzuki, Sodegaura (JP)

(73) Assignee: FUJITSU LIMITED, Kawasaki (JP)

( * ) Notice: Subject to any disclaimer, the term of this patent is extended or adjusted under 35 U.S.C. 154(b) by 156 days.

(21) Appl. No.: 14/247,011

(22) Filed: Apr. 7, 2014

(65) Prior Publication Data

US 2014/0307604 A1    Oct. 16, 2014

(30) Foreign Application Priority Data

Apr. 12, 2013 (JP) .................. 2013-084076

(51) Int. Cl.
*H04W 52/02* (2009.01)
*H04W 74/00* (2009.01)
*H04W 74/04* (2009.01)

(52) U.S. Cl.
CPC ...... *H04W 52/0216* (2013.01); *H04W 52/0261* (2013.01); *H04W 74/002* (2013.01); *H04W 74/04* (2013.01)

(58) Field of Classification Search
None
See application file for complete search history.

(56) References Cited

U.S. PATENT DOCUMENTS

| | | | | |
|---|---|---|---|---|
| 2004/0184475 A1* | 9/2004 | Meier | ............... | H04W 28/14 370/449 |
| 2006/0050742 A1* | 3/2006 | Grandhi | ............ | H04W 74/0816 370/506 |
| 2006/0072488 A1* | 4/2006 | Meier | ................ | H04L 12/1886 370/312 |
| 2006/0182071 A1* | 8/2006 | Soomro | ................ | H04L 1/188 370/338 |
| 2009/0285191 A1* | 11/2009 | Fang | .................. | H04L 1/1825 370/338 |
| 2010/0165896 A1* | 7/2010 | Gong | ............... | H04W 52/0216 370/311 |
| 2010/0315954 A1* | 12/2010 | Singh | ................. | H04W 72/044 370/241 |
| 2012/0188925 A1* | 7/2012 | Lee | ...................... | H04B 7/0452 370/311 |
| 2012/0281716 A1* | 11/2012 | Vijayasankar | ........ | H04B 3/542 370/478 |

FOREIGN PATENT DOCUMENTS

| | | |
|---|---|---|
| JP | 2006-521051 A | 9/2006 |
| JP | 2008-547326 A | 12/2008 |
| JP | 2011-517211 A | 5/2011 |
| JP | 2012-514427 A | 6/2012 |
| WO | WO 2004/079983 A1 | 9/2004 |
| WO | WO 2007/002363 A2 | 1/2007 |
| WO | WO 2009/123854 A1 | 10/2009 |
| WO | WO 2010/078206 A2 | 7/2010 |

* cited by examiner

*Primary Examiner* — Habte Mered
(74) *Attorney, Agent, or Firm* — Arent Fox LLP

(57) ABSTRACT

A communication device includes a memory, and a processor coupled to the memory and configured to transmit a first packet including a first information within a contention-free period assigned to the communication device, the first packet storing last data to be transmitted in the contention-free period, the first information indicating presence of remaining data to be transmitted in the contention-free period, and, after transmit the first packet, to transmit a second packet including a second information within the contention-free period, the second information indicating absence of remaining data to be transmitted in the contention-free period.

24 Claims, 16 Drawing Sheets

COMMUNICATION DEVICE AND METHOD FOR PACKET COMMUNICATIONS IN A CONTENTION-FREE PERIOD

CROSS-REFERENCE TO RELATED APPLICATION

This application is based upon and claims the benefit of priority of the prior Japanese Patent Application No. 2013-084076, filed on Apr. 12, 2013, the entire contents of which are incorporated herein by reference.

FIELD

The embodiments discussed herein are related to a communication device and a communication method.

BACKGROUND

Radio communication networks exist in which a contention-free period is assigned to each radio communication device, and each radio communication device transmits a packet in this contention-free period. An example of such radio communication networks is Body Area Network (BAN) standardized by Institute of Electrical and Electronic Engineers (IEEE) 802.15.6, or a Wireless Local Area Network (WLAN) standardized by IEEE 802.11.

A radio communication device that is assigned a contention-free period notifies the end of the data to be transmitted in this contention-free period. An example of this notification is a Last Frame bit used in BAN, or an End of Service Period (EOSP) bit used in WLAN. For example, the Last Frame bit contained in a packet storing last data, which is the last data to be transmitted within the contention-free period, is set to "valid", and the Last Frame bit contained in a packet transmitted before this packet is set to "invalid".

A receiver that receives a packet from a radio communication device that is assigned a contention-free period is released from a wait-to-receive state upon receiving a packet containing a valid Last Frame bit. Once the receiver receives the packet containing a valid Last Frame bit, the receiver is able to assign a new contention-free period to another radio communication device.

In the following description, a packet containing a notification notifying the end of the data to be transmitted in a contention-free period will be sometimes referred to as "end notification packet".

In related art, a method exists in which, for every wake-up period, two peer stations exchange at least one data packet. Even if a station does not have any buffered data to transfer, the station transmits a "NULL" data frame having an EOSP set to "1". Upon receiving the "NULL" data frame, the other peer station sends back an "ACK" frame with a More Data bit set to "0".

A method exists in which, despite the data traffic being buffered, a first station transmits a data frame with a Power bit to notify a second station that the first station intends to return to a power saving mode. Such a method is desired when, for example, the remaining battery time of the first station is very low.

A bit called "MORE FRAMES" is used in the European Computer Manufacturers Association (ECMA)-368 standard to control permitted transition to a inactive cycle of an active receiving device.

A method exists in which a More Data field is used between stations to exchange information related to future data transmissions. Stations with different computing capacities provide information under different time limits. The stations use a promiscuous mode or enter a power saving mode that transmits multicast/broadcast frames within an Announcement Traffic Indication Message (ATIM) window.

A method exists which transmits a frame from a first device of WLAN to a second device of WLAN. This method transmits a first frame containing a first transmission index from the first device to the second device, and sends the last frame containing the last transmission index indicating that the service period will end at a specific time. Examples of related art include Japanese National Publication of International Patent Application No. 2012-514427, Japanese National Publication of International Patent Application No. 2011-517211, Japanese National Publication of International Patent Application No. 2008-547326, and Japanese National Publication of International Patent Application No. 2006-521051.

SUMMARY

According to an aspect of the invention, a communication device includes a memory, and a processor coupled to the memory and configured to transmit a first packet including a first information within a contention-free period assigned to the communication device, the first packet storing last data to be transmitted in the contention-free period, the first information indicating presence of remaining data to be transmitted in the contention-free period, and, after transmit the first packet, to transmit a second packet including a second information within the contention-free period, the second information indicating absence of remaining data to be transmitted in the contention-free period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In some cases, it may not be allowed to transmit an end notification packet multiple times within a single contention-free period. For example, in the case of BAN, after transmitting a packet containing a valid Last Frame bit, it is inhibited to transmit another packet within the same contention-free period.

Figure 1:
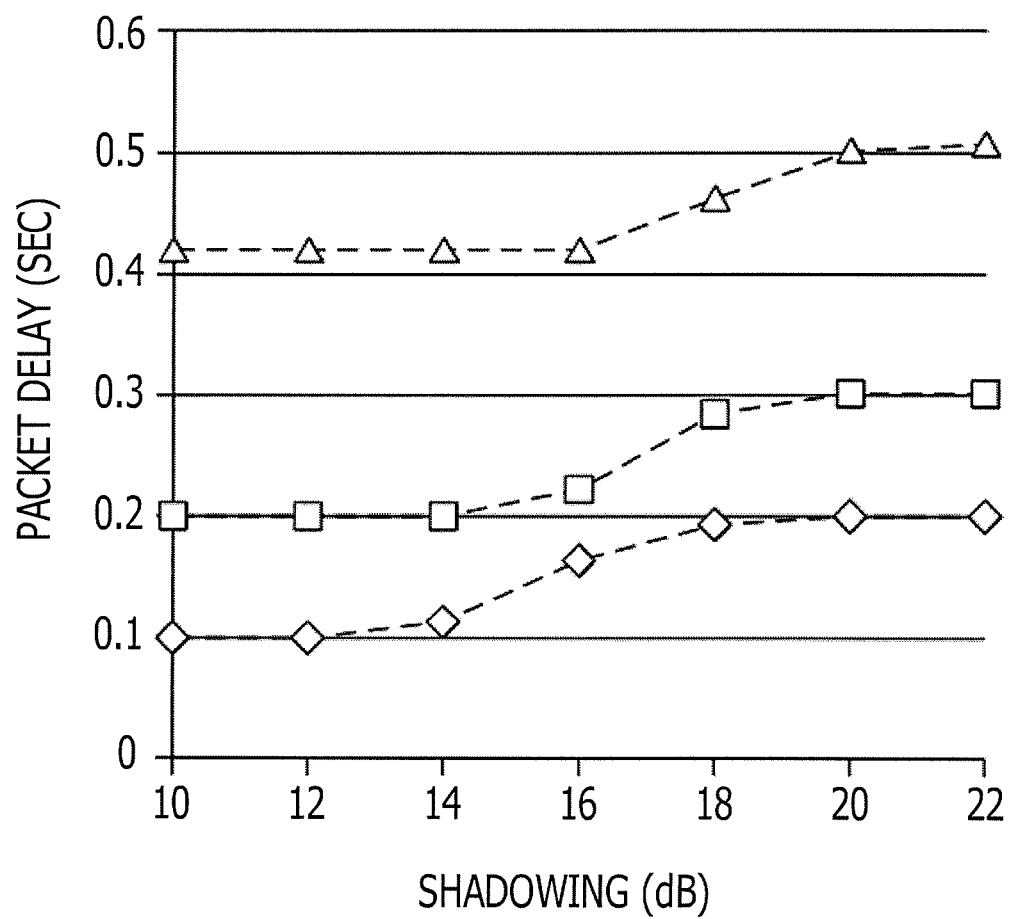
FIG. 1 is a graph illustrating the relationship between communication state and packet delay.

The inability to transmit an end notification packet multiple times within a single contention-free period may lead to a large packet delay when the communication state deteriorates. FIG. 1 is a graph illustrating the relationship between communication state and packet delay.

The vertical axis represents the value of packet delay when the cumulative frequency of packets becomes 99 percent, and the horizontal axis represents the value of shadowing, which is signal power loss caused by shadowing of radio waves. The plot lines with rhombic, square, and triangular marks indicate packet delays when one, two, and four packets, respectively, are generated in a single contention-free period.

As illustrated as FIG. 1, packet delay increases as shadowing increases. This is assumed to be because in a case where delivery of an end notification packet that stores the last data is not successfully confirmed, it is not possible to retransmit a packet within the same contention-free period, resulting in the retransmission being delayed until the next contention-free period.

Figure 2:
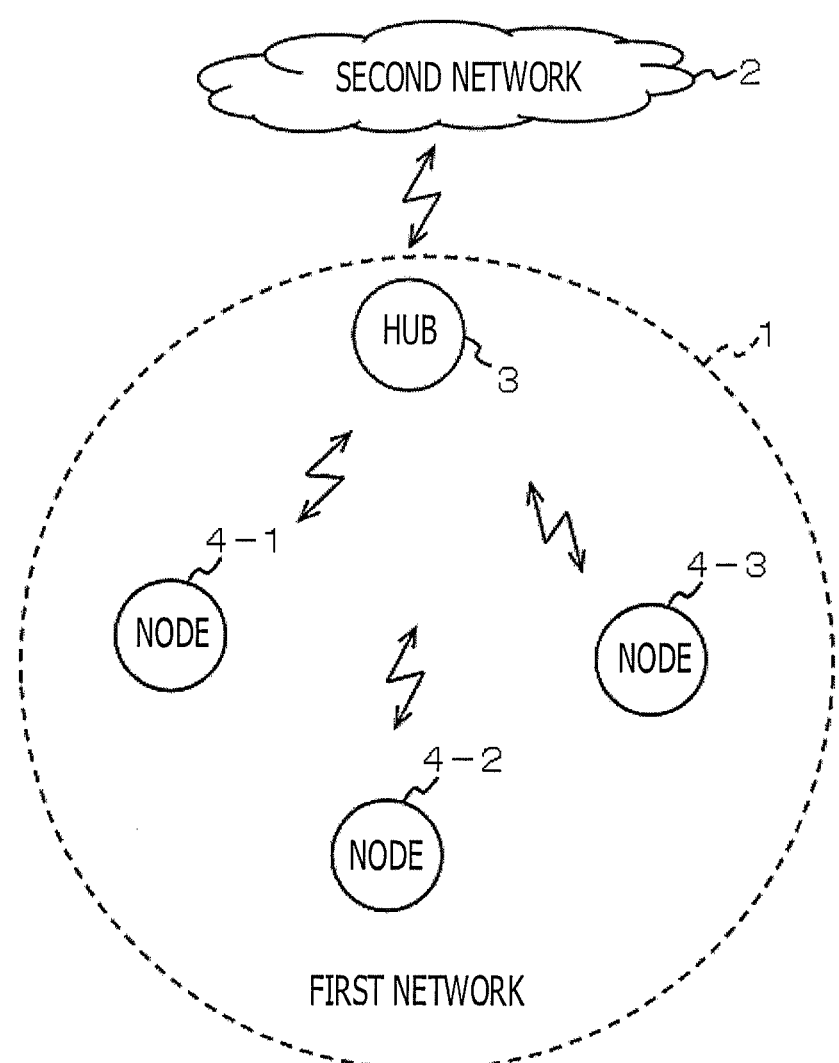
FIG. 2 is an explanatory drawing of a configuration example of a communication system.

FIG. 2 is an explanatory drawing of a configuration example of a communication system. As illustrated as FIG. 2, a first network 1 and a second network 2 are connected via a hub device 3. The first network 1 is a multi-hop network including the hub device 3, and node devices 4-1 to 4-3. In the following description, the node devices and the hub device will be sometimes referred to as "nodes" and "hub", respectively. The nodes 4-1 to 4-3 will be sometimes referred to collectively as "nodes 4".

The nodes 4 transmit data to the hub 3 by multi-hop communication. The hub 3 transfers data collected from the nodes 4 to another communication device via the second network. The first network 1 is, for example, BAN or WLAN.

The node 4-1 is given a contention-free period in which only the node 4-1 is permitted to transmit packets. When transmission of data to be transmitted in a single contention-free period ends, the node 4-1 transmits an end notification packet. An end notification packet indicates that there is no remaining data to be transmitted in the contention-free period, by setting a flag stored in a predetermined area within the packet to valid. An example of this flag is a Last Frame bit used in BAN or an EOSP bit used in WLAN.

The following description will be directed to an example in which the first network 1 is BAN, and a flag indicating the presence/absence of remaining data to be transmitted in a contention-free period is a Last Frame bit. However, this example is not intended to imply that the network described herein is applied to only BAN. The network described herein can be applied to a wide variety of networks that use an end notification packet.

First Embodiment

Figure 3:
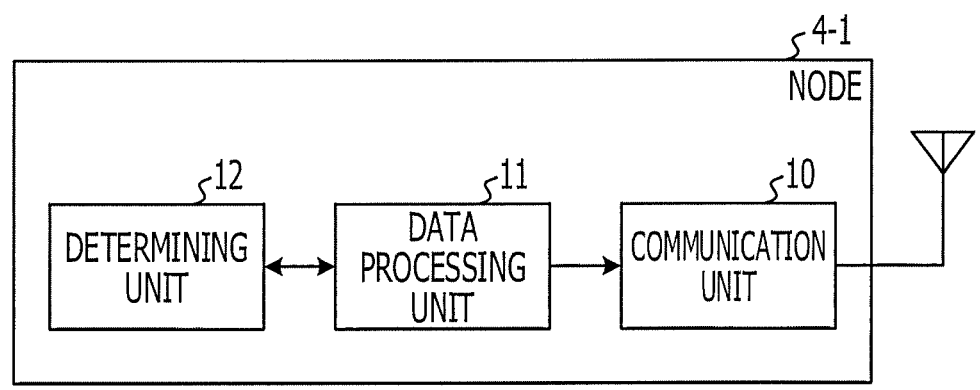
FIG. 3 is an explanatory drawing of a first example of the functional configuration of a node device.

FIG. 3 is an explanatory drawing of a first example of the functional configuration of the node 4-1. The other nodes 4-2 and 4-3 are configured in the same manner as the node 4-1. The node 4-1 includes a communication unit 10, a data processing unit 11, and a determining unit 12.

Data to be processed within the node 4-1 is processed by the data processing unit 11. When transmitting data while storing the data in a packet, the data processing unit 11 determines whether or not there is remaining data to be transmitted in the same contention-free period as the contention-free period in which this data is transmitted. The data processing unit 11 outputs the determination result to the determining unit 12.

The determining unit 12 determines whether or not to set a Last Frame bit to valid in accordance with the determination result from the data processing unit 11. The determining unit 12 instructs the data processing unit 11 to make the Last Frame bit of a packet that stores the last data to be transmitted in the contention-free period invalid. When setting the Last Frame bit to valid, the determining unit 12 instructs the data processing unit 11 to set the Last Frame bit of a packet transmitted after the packet storing the last data to valid.

In the following description, a packet that stores the last data will be sometimes referred to as "first packet". A packet transmitted after the first packet and containing a valid Last Frame bit will be sometimes referred to as "second packet".

The data processing unit 11 creates the first packet and the second packet. For example, the data processing unit 11 creates the second packet containing an empty payload. The data processing unit 11 sets the Last Frame bits of the first packet and second packet to invalid and valid, respectively, in accordance with an instruction from the determining unit 12. The data processing unit 11 transmits the first packet via the communication unit 10. After confirming delivery of the first packet, the data processing unit 11 transmits the second packet via the communication unit 10 in the same contention-free period as the contention-free period in which the first packet has been transmitted.

Figure 4:
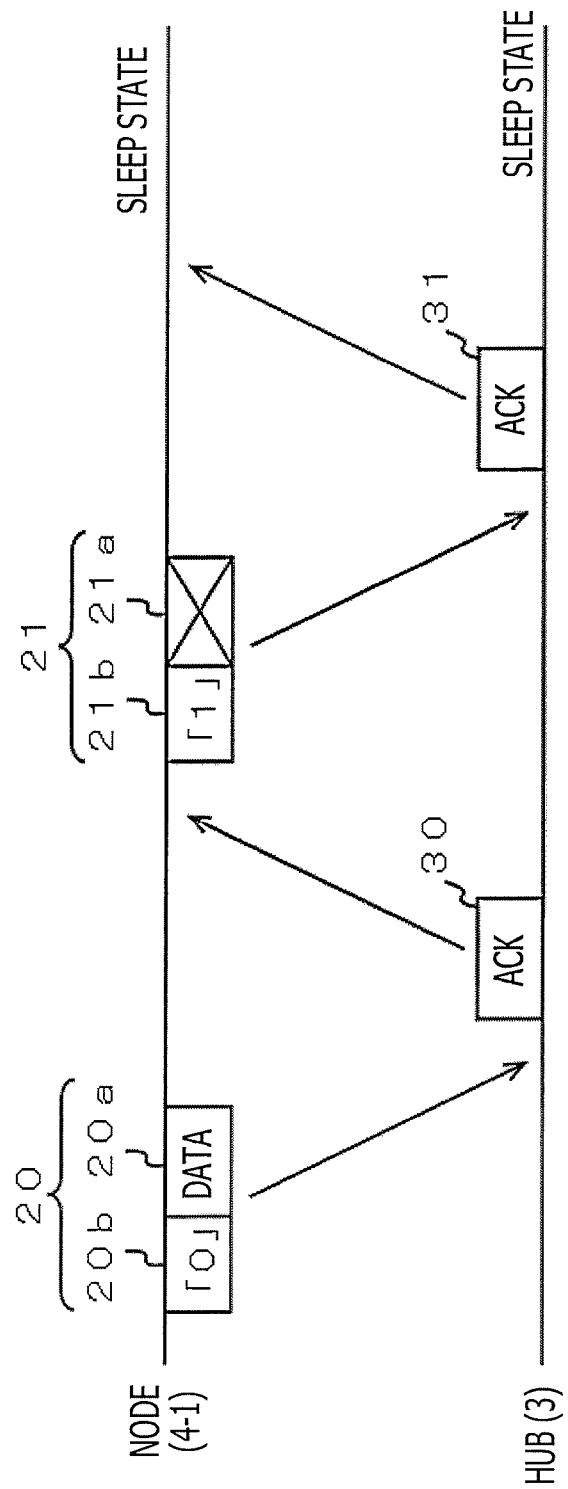
FIG. 4 is an explanatory drawing of a first example of the transmit timing of a Last Frame bit.

FIG. 4 is an explanatory drawing of a first example of the transmit timing of a Last Frame bit. The node 4-1 transmits a first packet 20 to the hub 3 in a contention-free period. The first packet 20 contains a payload 20a in which last data is stored, and an invalid Last Frame bit 20b, that is, a Last Frame bit 20b with a value "0".

The hub 3 that has received the first packet 20 transmits an ACK signal 30 to the node 4-1. After confirming delivery of the first packet 20 by receipt of the ACK signal 30, the node 4-1 transmits a second packet 21. The second packet 21 contains an empty payload 21a, and a valid Last Frame bit 21b, that is, a Last Frame bit 21b with a value "1". The hub 3 that has received the second packet 21 transmits the ACK signal 30 to the node 4-1. After transmitting the ACK signal 31, the hub 3 transitions to a sleep state. After receiving the ACK signal 31, the node 4-1 transitions to a sleep state.

Figure 5:
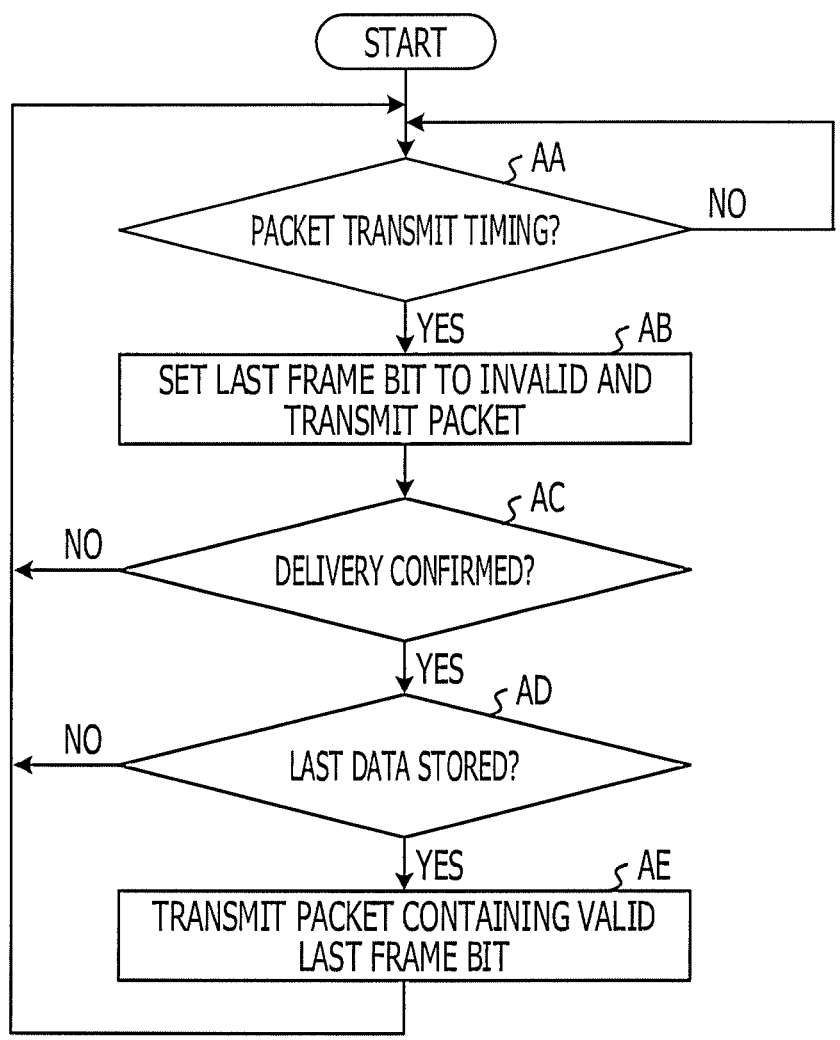
FIG. 5 is an explanatory drawing of a first example of an operation to transmit a Last Frame bit.

FIG. 5 is an explanatory drawing of a first example of an operation to transmit a Last Frame bit. In operation AA, the data processing unit 11 determines whether or not the present timing is the packet transmit timing. In a case where the present timing is not the packet transmit timing (operation AA: N), the operation returns to operation AA. In a case where the present timing is the packet transmit timing (operation AA: Y), the operation advances to operation AB.

In operation AB, the determining unit 12 instructs the data processing unit 11 to set the Last Frame bit of a transmit packet that stores data to invalid. The data processing unit 11 creates a packet storing data, and sets the Last Frame bit of the packet to invalid. The data processing unit 11 transmits the packet via the communication unit 10.

In operation AC, the data processing unit 11 determines whether or not delivery of the packet transmitted in operation AB has been confirmed. In a case where the delivery is not confirmed (operation AC: N), the operation returns to operation AA. In a case where the delivery has been confirmed (operation AC: Y), the operation advances to operation AD.

In operation AD, the data processing unit 11 determines whether or not the data stored in the packet transmitted in operation AB is the last data to be transmitted in a contention-free period. In a case where the stored data is not the last data (operation AD: N), the operation returns to operation AA. In a case where the stored data is the last data (operation AD: Y), the operation advances to operation AE.

In operation AE, the determining unit 12 instructs the data processing unit 11 to transmit a packet containing a valid Last Frame bit. The data processing unit 11 transmits a packet containing a valid Last Frame bit in the same contention-free period as the contention-free period in which a packet has been transmitted in operation AB.

According to the first embodiment, the Last Frame bit of a packet that stores the last data to be transmitted in a given contention-free period is set to invalid. Consequently, even if it is inhibited to transmit a packet containing a valid Last Frame bit multiple times within the same contention-free period, it is possible to retransmit a packet containing the last data. Therefore, the chance of the last data scheduled to be transmitted in a given contention-free period being retransmitted in the next contention-free period is reduced, thereby expediting the completion of transmission of the last data.

Further, by setting the Last Frame bit of a packet storing an empty payload to valid, the packet length of a packet containing a valid Last Frame bit may be reduced. Consequently, the rate of success in the delivery of a packet containing a valid Last Frame bit may be increased. Therefore, it is possible to release the hub 3 from a wait-to-receive state during a contention-free period at earlier timing. Moreover, it is possible for the hub 3 to assign a new contention-free period to the other node 4-2 or 4-3 at earlier timing.

Figure 6:
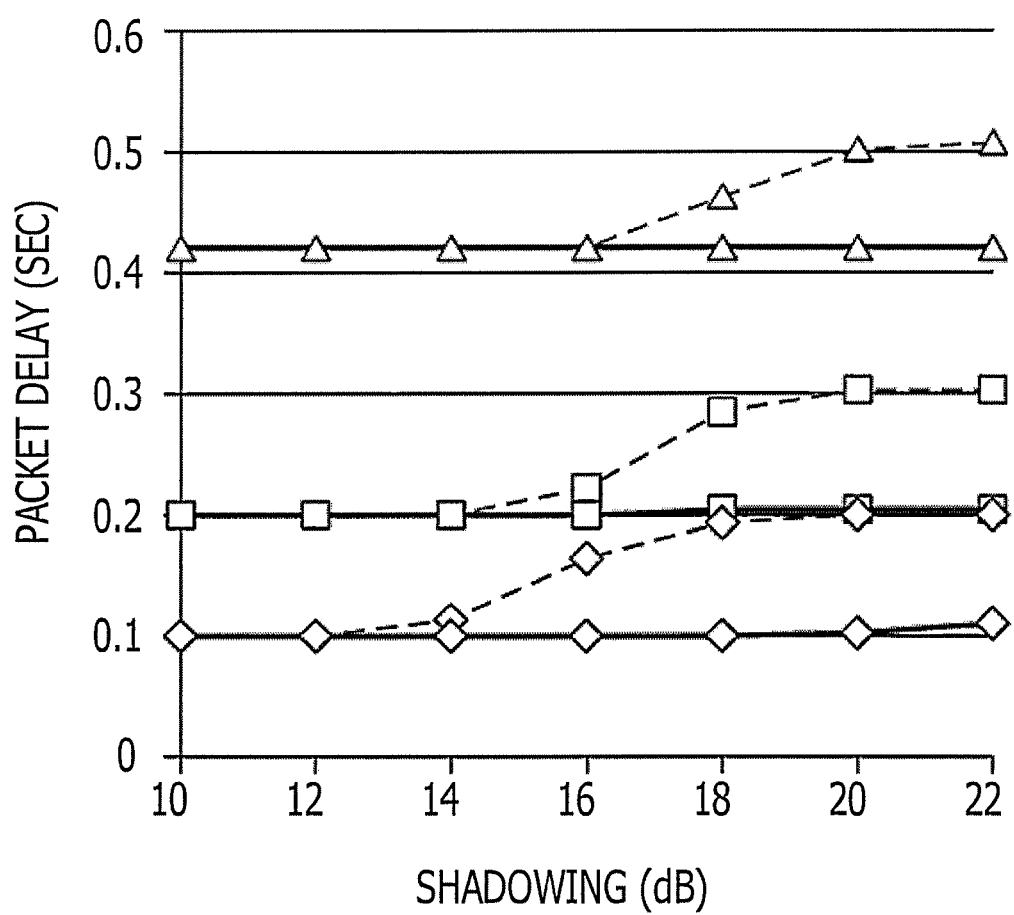
FIG. 6 is a graph illustrating the relationship between communication state and packet delay.

FIG. 6 is a graph illustrating the difference in packet delay between a case where the Last Frame bit of a packet that stores the last data is set to valid, and a case where the Last Frame bit of a packet that follows the packet storing the last data is set to valid. The vertical axis represents the value of packet delay when the cumulative frequency of packets becomes 99 percent, and the horizontal axis represents the value of shadowing.

The dotted plot line indicates packet delay in a case where the Last Frame bit of a packet that stores the last data is set to valid. The solid plot line indicates packet delay in a case where the Last Frame bit of a packet that stores the last data is set to invalid, and the Last Frame bit of the packet following this packet is set to valid. The plot lines with rhombic, square, and triangular marks indicate packet delays when one, two, and four packets, respectively, are generated in a single contention-free period.

As illustrated as FIG. 6, packet delay is smaller in the case where the Last Frame bit of a packet that stores the last data is set to invalid, and the Last Frame bit of the packet following this packet is set to valid, than in the case where the Last Frame bit of a packet that stores the last data is set to valid.

In addition, the increase in delay due to the communication state is smaller in the case where the Last Frame bit of a packet that stores the last data is set to invalid, and the Last Frame bit of the packet following this packet is set to valid, than in the case where the Last Frame bit of a packet that stores the last data is set to valid.

Second Embodiment

The determining unit 12 may switch the packet for which to set the Last Frame bit to valid, between a first packet that stores the last data, and a second packet that follows the first packet. That is, the determining unit 12 may determine whether to set the Last Frame bit of the first packet to valid, or to set the Last Frame bit of the first packet to invalid and set the Last Frame bit of the second packet to valid.

In a case where the determining unit 12 determines to set the Last Frame bit of the first packet to invalid and set the Last Frame bit of the second packet to valid, the data processing unit 11 creates the first packet and the second packet. The data processing unit 11 sets the Last Frame bits of the first packet and second packet to invalid and valid, respectively. The data processing unit 11 transmits the first packet via the communication unit 10, and after confirming delivery of the first packet, the data processing unit 11 transmits the second packet via the communication unit 10 in the same contention-free period in which the first packet has been transmitted.

In a case where the determining unit 12 determines to set the Last Frame bit of the first packet to valid, the data processing unit 11 creates the first packet, and sets the Last Frame bit of the created first packet to valid. The data processing unit 11 transmits the first packet via the communication unit 10. In this case, the data processing unit 11 may not have to create and transmit the second packet.

Figure 7:
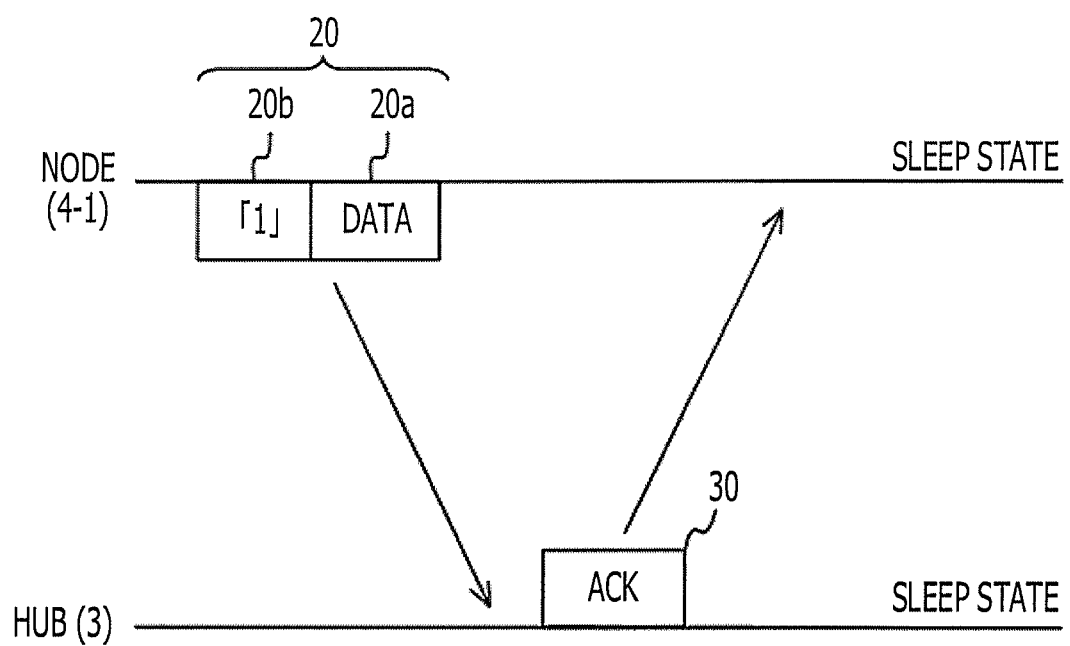
FIG. 7 is an explanatory drawing of a second example of the transmit timing of a Last Frame bit.

FIG. 7 is an explanatory drawing of a second example of the transmit timing of a Last Frame bit contained in the first packet. The node 4-1 transmits the first packet 20 to the hub 3 in a contention-free period. The first packet 20 contains the payload 20a in which the last data is stored, and the Last Frame bit 20b that is valid, that is, the Last Frame bit 20b with a value "1".

The hub 3 that has received the first packet 20 transmits the ACK signal 30 to the node 4-1. After transmitting the ACK signal 30, the hub 3 transitions to a sleep state. After receiving the ACK signal 30, the node 4-1 transitions to a sleep state.

Figure 8:
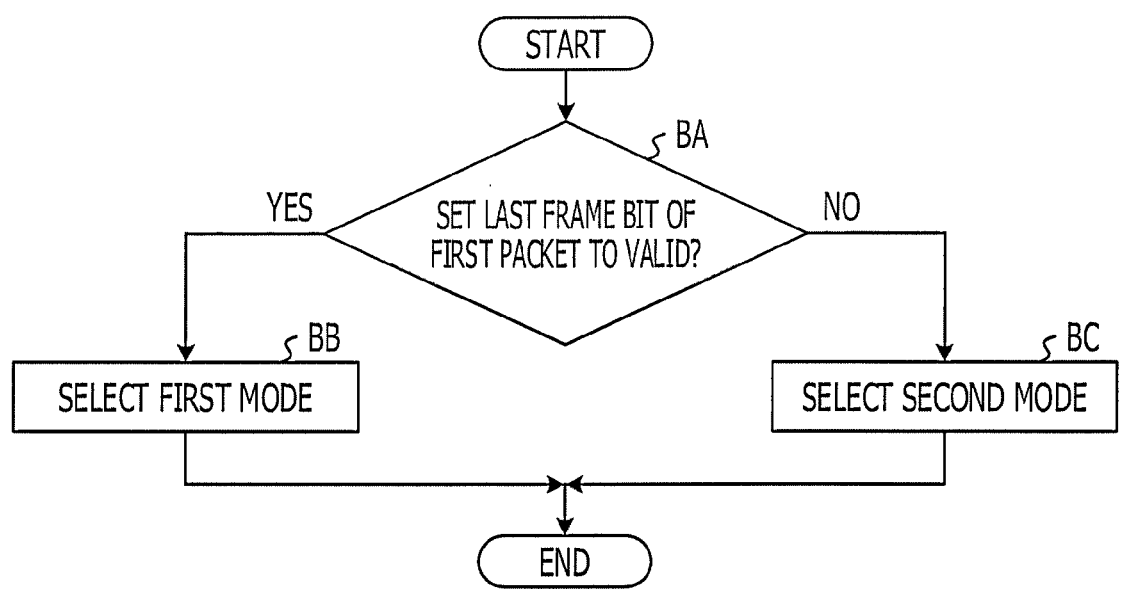
FIG. 8 is an explanatory drawing of a first example of an operation to determine the transmission mode for a Last Frame bit.

FIG. 8 is an explanatory drawing of a first example of an operation to determine the transmission mode for a Last Frame bit. In operation BA, the determining unit 12 determines whether the packet for which to set the Last Frame bit to valid is the first packet or the second packet that follows the first packet. In a case where the Last Frame bit of the first packet is to be set to valid (operation BA: Y), the operation advances to operation BB. In a case where the Last Frame bit of the second packet is to be set to valid (operation BA: N), the operation advances to operation BC.

In operation BB, the determining unit 12 selects a first mode as the transmission mode for the Last Frame bit. The first mode is a mode that transmits the first packet containing a valid Last Frame bit. Thereafter, the operation ends.

In operation BC, the determining unit 12 selects a second mode as the transmission mode for the Last Frame bit. The second mode is a mode that transmits the first packet containing an invalid Last Frame bit, and the second packet containing a valid Last Frame bit. Thereafter, the operation ends.

Figure 9:
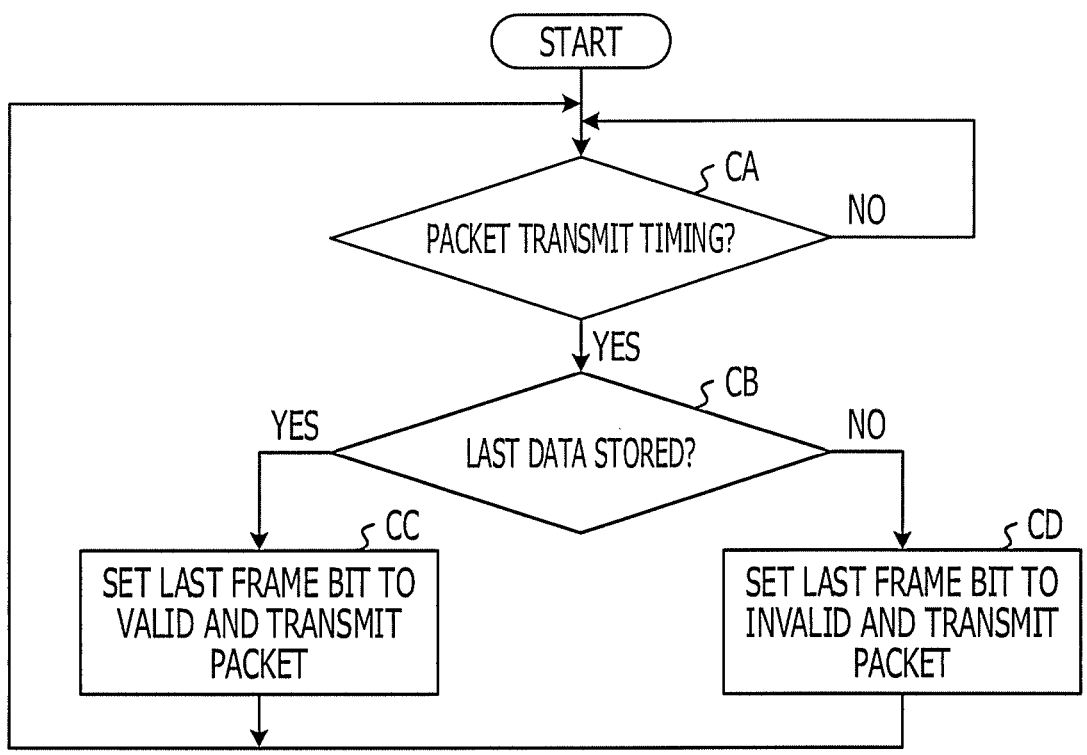
FIG. 9 is an explanatory drawing of a second example of an operation to transmit a Last Frame bit.

The transmitting operation for a Last Frame bit in the second mode is the same as the transmitting operation described above with reference to FIG. 5. FIG. 9 is an explanatory drawing of an example of an operation to transmit a Last Frame bit in the first mode. In operation CA, the data processing unit 11 determines whether or not the present timing is the packet transmit timing. In a case where the present timing is not the packet transmit timing (operation CA: N), the operation returns to operation CA. In a case where the present timing is the packet transmit timing (operation CA: Y), the operation advances to operation CB.

In operation CB, the data processing unit 11 determines whether or not the data stored in a packet to be transmitted is the last data to be transmitted in the contention-free period. In a case where the last data is stored in the packet to be transmitted (operation CB: Y), the operation advances to operation CC. In a case where the last data is not stored in the packet to be transmitted (operation CB: N), the operation advances to operation CD.

In operation CC, the determining unit 12 instructs the data processing unit 11 to set the Last Frame bit of the transmit packet that stores the last data to valid. The data processing unit 11 creates a packet that stores the last data, and sets the Last Frame bit of the created packet to valid. The data processing unit 11 transmits the packet via the communication unit 10.

In operation CD, the determining unit 12 instructs the data processing unit 11 to set the Last Frame bit of the transmit packet storing data that is not the last data to invalid. The data processing unit 11 creates a packet storing data that is not the last data, and sets the Last Frame bit of the created packet to invalid. The data processing unit 11 transmits the packet via the communication unit 10.

According to the second embodiment, the node 4-1 may switch the transmission mode for the Last Frame bit between the first mode and the second mode. For example, the node 4-1 may use the second mode in a system in which it is inhibited to transmit a packet containing a valid Last Frame bit multiple times within the same contention-free period, and use the first mode in other systems. Use of the first mode makes it possible to avoid an increase in overhead that occurs as a result of transmitting a packet containing a valid Last Frame bit separately from a packet that stores the last data.

Third Embodiment

Figure 10:
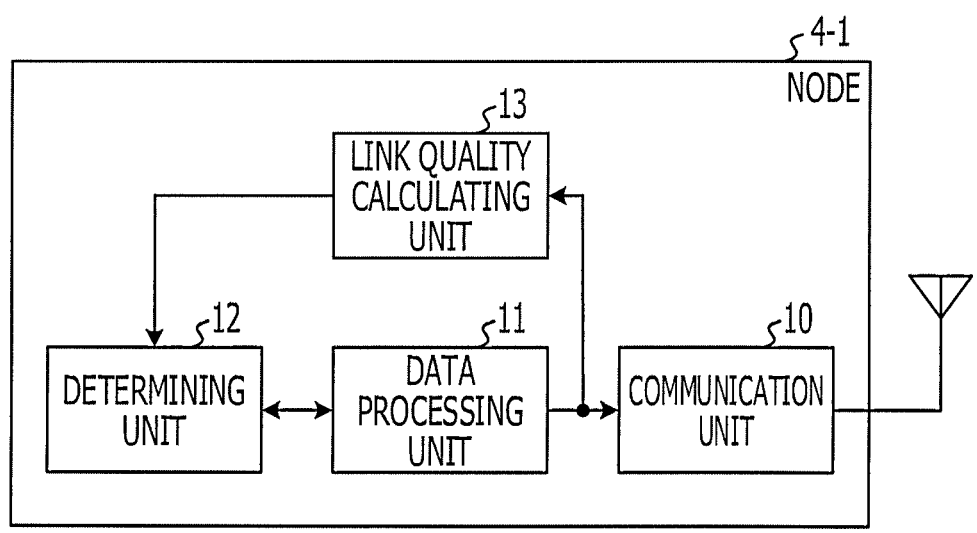
FIG. 10 is an explanatory drawing of a second example of the functional configuration of a node device.

FIG. 10 is an explanatory drawing of a second example of the functional configuration of the node 4-1. Components that are the same as the components illustrated as FIG. 3 are denoted by the same reference numerals as those used in FIG. 3. The node 4-1 includes a link quality calculating unit 13. The link quality calculating unit 13 calculates the link quality of the link to the hub 3 that is the destination of the last data.

For example, the link quality calculating unit 13 measures the received signal strength indication (RSSI) with which a packet is received from the hub 3. For example, the link quality calculating unit 13 may calculate, as the link quality, the average of RSSIs with which a packet has been received multiple times in the past. For example, the link quality calculating unit 13 may calculate, as the link quality, the average of RSSIs with which a packet has been received in a predetermined period in the past.

Alternatively, as an index of the link quality between the hub 3 and the node 4-1, one of or a combination of at least two of received signal strength indication, signal-to-interference plus noise power ratio (SINR), bit error ratio (BER), and packet error ratio (PER) may be used. The link quality calculating unit 13 outputs the calculated link quality to the determining unit 12.

In accordance with the link quality received from the link quality calculating unit 13, the determining unit 12 selects one of the first mode and the second mode as the transmission mode for the Last Frame bit. For example, the determining unit 12 selects one of the first mode and the second mode as the transmission mode for the Last Frame bit in accordance with whether or not the link quality satisfies a predetermined condition.

For example, the determining unit 12 may select the first mode in a case where the index indicating the link quality is higher than or equal to a predetermined threshold, and select the second mode in a case where the index is below the predetermined threshold. Alternatively, the determining unit 12 may select the first mode in a case where the average of RSSIs is higher than or equal to a predetermined threshold, and select the second mode in a case where the average of RSSIs is below the predetermined threshold.

The predetermined threshold may be, for example, a RSSI with which a predetermined size of packet delay is expected in the first mode. The predetermined size of packet delay may be a permissible delay prescribed by system requirements. For example, the predetermined size of packet delay may be "0.25 second".

Figure 11:
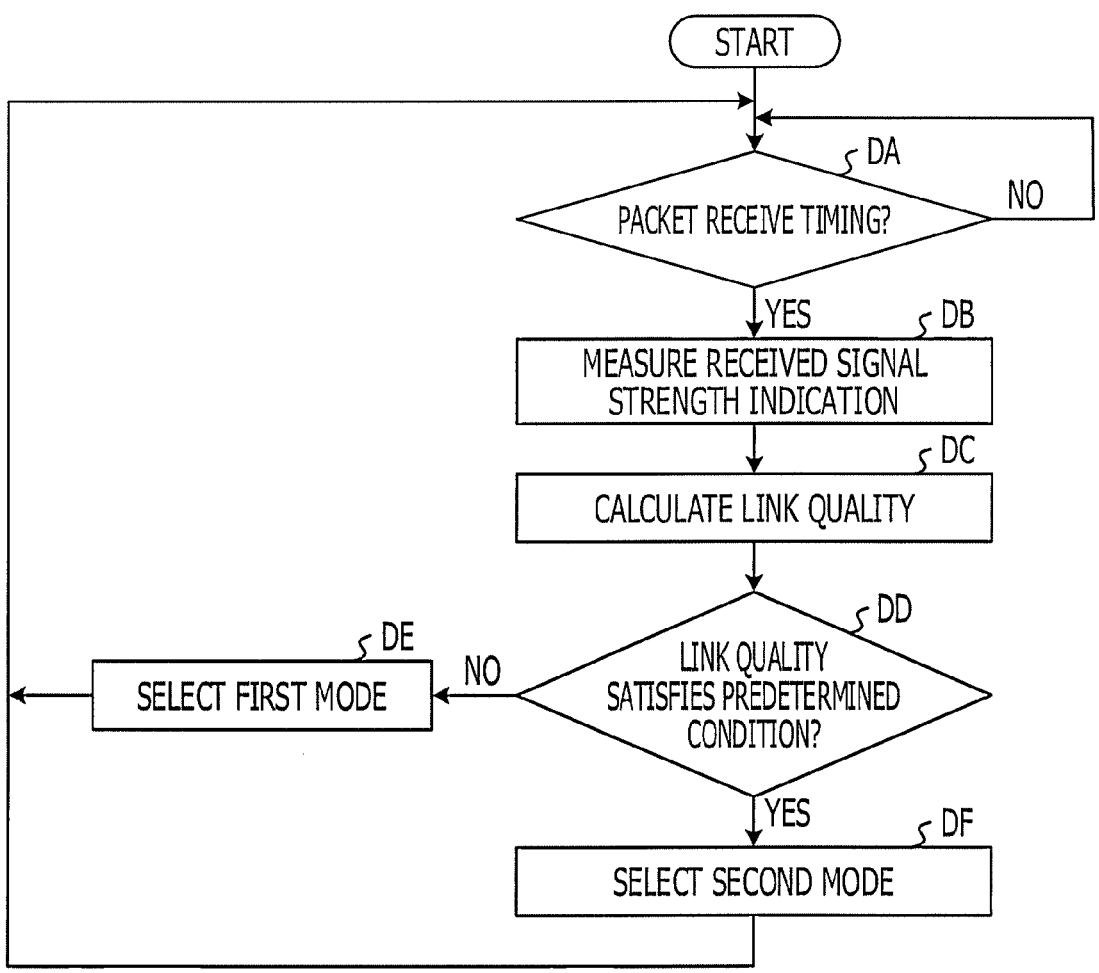
FIG. 11 is an explanatory drawing of a second example of an operation to determine the transmission mode for a Last Frame bit.

FIG. 11 is an explanatory drawing of a second example of an operation to determine the transmission mode for a Last Frame bit. In operation DA, the link quality calculating unit 13 determines whether or not the present timing is the receive timing for a packet from the hub 3. In a case where the present timing is not the packet receive timing (operation DA: N), the operation returns to operation DA. In a case where the present timing is the packet receive timing (operation DA: Y), the operation advances to operation DB.

In operation DB, the link quality calculating unit 13 measures the received signal strength indication of a packet. In operation DC, the link quality calculating unit 13 calculates the link quality between the hub 3 and the node 4-1 based on the received signal strength indication.

In operation DD, the determining unit 12 determines whether or not the link quality satisfies a predetermined condition. In a case where the link quality does not satisfy the predetermined condition (operation DD: N), the operation advances to operation DE. In a case where the link quality satisfies the predetermined condition (operation DD: Y), the operation advances to operation DF.

In operation DE, the determining unit 12 selects the first mode as the transmission mode for the Last Frame bit. Thereafter, the operation ends. In operation DF, the determining unit 12 selects the second mode as the transmission mode for the Last Frame bit. Thereafter, the operation ends.

Figure 12A:
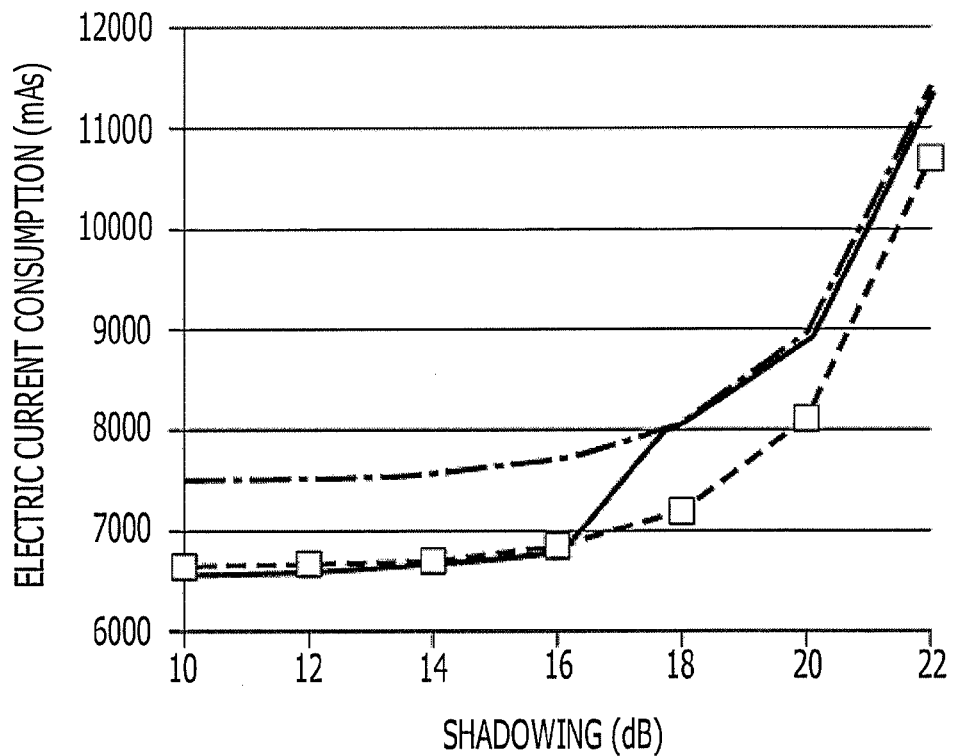
FIG. 12A is a graph illustrating the relationship between communication state and electric current consumption.
Figure 12B:
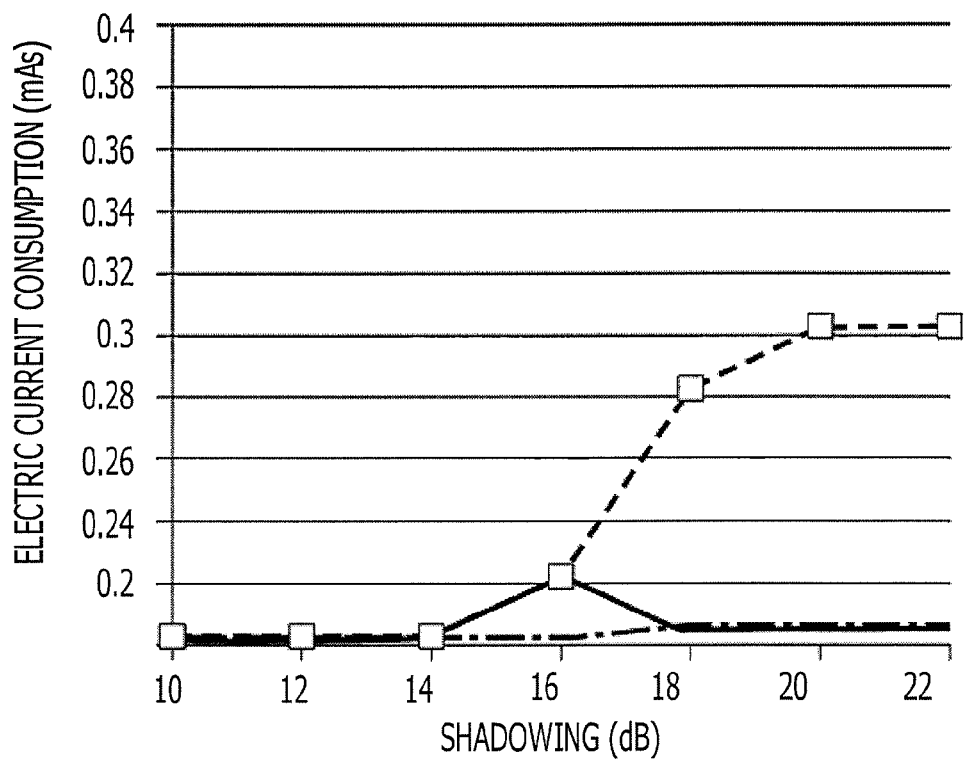
FIG. 12B is a graph illustrating the relationship between communication state and packet delay.

FIG. 12A is a graph illustrating the relationship between electric current consumption and communication state in each of a case where a Last Frame bit is transmitted in the first mode and a case where a Last Frame bit is transmitted in the second mode. The vertical axis represents electric current consumption, and the horizontal axis represents the value of shadowing. FIG. 12B is a graph illustrating the relationship between packet delay and communication state in each of a case where a Last Frame bit is transmitted in the first mode and a case where a Last Frame bit is transmitted in the second mode. The vertical axis represents the value of packet delay when the cumulative frequency of packets becomes 99 percent, and the horizontal axis represents the value of shadowing.

The dotted line indicates electric current consumption and packet delay in a case where the Last Frame bit is transmitted in the first mode, and the alternate long and short dash line indicates electric current consumption and packet delay in a case where the Last Frame bit is transmitted in the second mode.

As illustrated as FIG. 12B, the packet delay in the case of the second mode is smaller than the packet delay in the case of the first mode. In addition, the increase in packet delay due to the communication state in the case of the second mode is smaller than the increase in packet delay in the case of the first mode.

Meanwhile, as illustrated as FIG. 12A, the electric current consumption in the case of the second mode is greater than the electric current consumption in the case of the first mode. This is due to an overhead that occurs as a result of transmitting a packet containing a valid Last Frame bit separately from a packet that stores the last data.

The solid lines depicted in FIG. 12A and FIG. 12B indicate electric current consumption and packet delay, respectively, in a case where the transmission mode for the Last Frame bit is switched so that the first mode is used when shadowing is lower than or equal to 16 dB, and the second mode is otherwise used. By switching the modes for transmitting the Last Frame bit, occurrence of a packet delay exceeding a permissible delay prescribed by system requirements may be reduced, while reducing electric current consumption in comparison to a case where only the second mode is used.

Modification of Third Embodiment

The communication unit 10 may receive a signal or packet containing information about the link quality of the link between the hub 3 and the node 4-1 from a communication device other than the node 4-1. The data processing unit 11 acquires information about link quality from a received signal, and outputs the information to the determining unit 12. The determining unit 12 selects one of the first mode and the second mode as the transmission mode for the Last Frame bit, in accordance with the information about link quality received from the data processing unit 11.

Information about link quality may be received from, for example, the hub 3 that is the destination of the last data. Information about the link quality of the link between the hub 3 and the node 4-1 may be received from the node 4-2 or 4-3 other than the hub 3. For example, the node 4-2 or 4-3 may listen to an ACK signal and a negative acknowledgement (NACK) signal, which are delivery confirmation signals for the packet communication between the hub 3 and the node 4-1, and calculate the PER between the hub 3 and the node 4-1 as link quality based on the delivery confirmation signals.

The communication unit 10 may receive a predetermined condition related to link quality from a communication device other than the node 4-1. Such another communication device may be, for example, the hub 3, or the node 4-2 or 4-3. The determining unit 12 selects one of the first mode and the second mode as the transmission for the Last Frame bit in accordance with whether or not the link quality satisfies the received predetermined condition. The predetermined condition may be, for example, a threshold that is compared against the link quality.

The communication unit 10 may receive an instruction signal indicating one of the first mode and the second mode from a communication device other than the node 4-1. Such another communication device may be, for example, the hub 3, or the node 4-2 or 4-3. The determining unit 12 selects the transmission mode indicated by the received instruction signal, as the transmission mode for the Last Frame bit.

Fourth Embodiment

Figure 13:
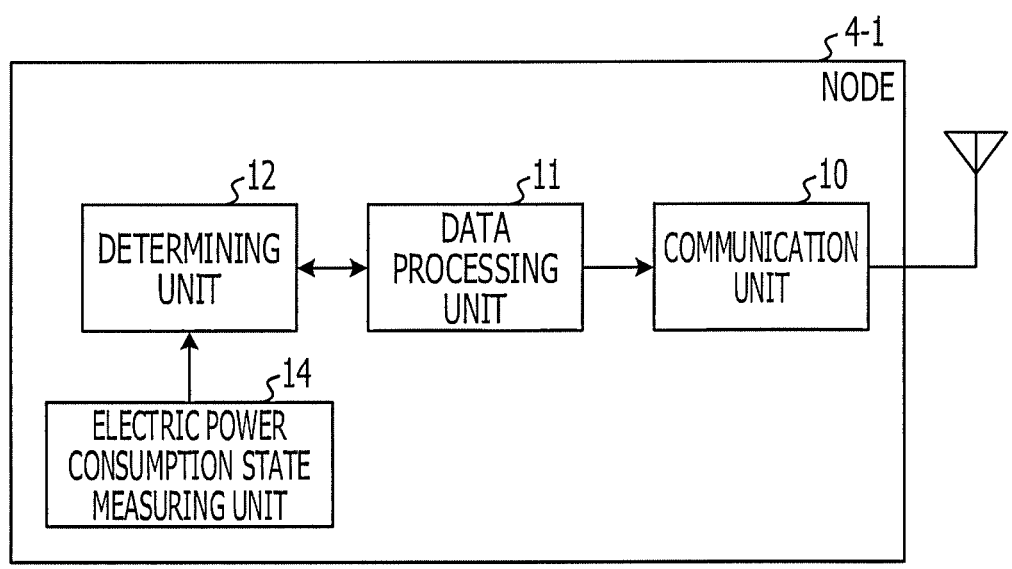
FIG. 13 is an explanatory drawing of a third example of the functional configuration of a node device.

FIG. 13 is an explanatory drawing of a third example of the functional configuration of the node 4-1. Components that are the same as the components illustrated as FIG. 3 are denoted by the same reference numerals as those used in FIG. 3. The node 4-1 includes an electric power consumption state measuring unit 14. The electric power consumption state measuring unit 14 measures the electric power consumption state of the node 4-1. The electric power consumption state may be, for example, one of the remaining capacity of a battery that supplies operating electric power to the node 4-1, the electric power consumption of the node 4-1, and the electric current consumption of the node 4-1. The electric power consumption state measuring unit 14 outputs the measurement results to the determining unit 12.

The determining unit 12 selects one of the first mode and the second mode as the transmission mode for the Last Frame bit, in accordance with the measurement results on electric power consumption state received from the electric power consumption state measuring unit 14. For example, the determining unit 12 selects one of the first mode and the second mode as the transmission mode for the Last Frame bit in accordance with whether or not the electric power consumption state satisfies a predetermined condition.

For example, the determining unit 12 may select the second mode in a case where an index indicating the electric power consumption state is higher than or equal to a predetermined threshold, and select the first mode in a case where the index is below the predetermined threshold. In a case where the index is the remaining capacity of a battery, the determining unit 12 may select the second mode in a case where the remaining capacity of the battery is higher than or equal to a predetermined threshold, and select the first mode in a case where the remaining capacity of the battery is below the predetermined threshold. The predetermined threshold may be, for example, the remaining battery capacity at which the remaining drive time in the second mode becomes less than a predetermined time. The predetermined time may be, for example, one hour.

Figure 14:
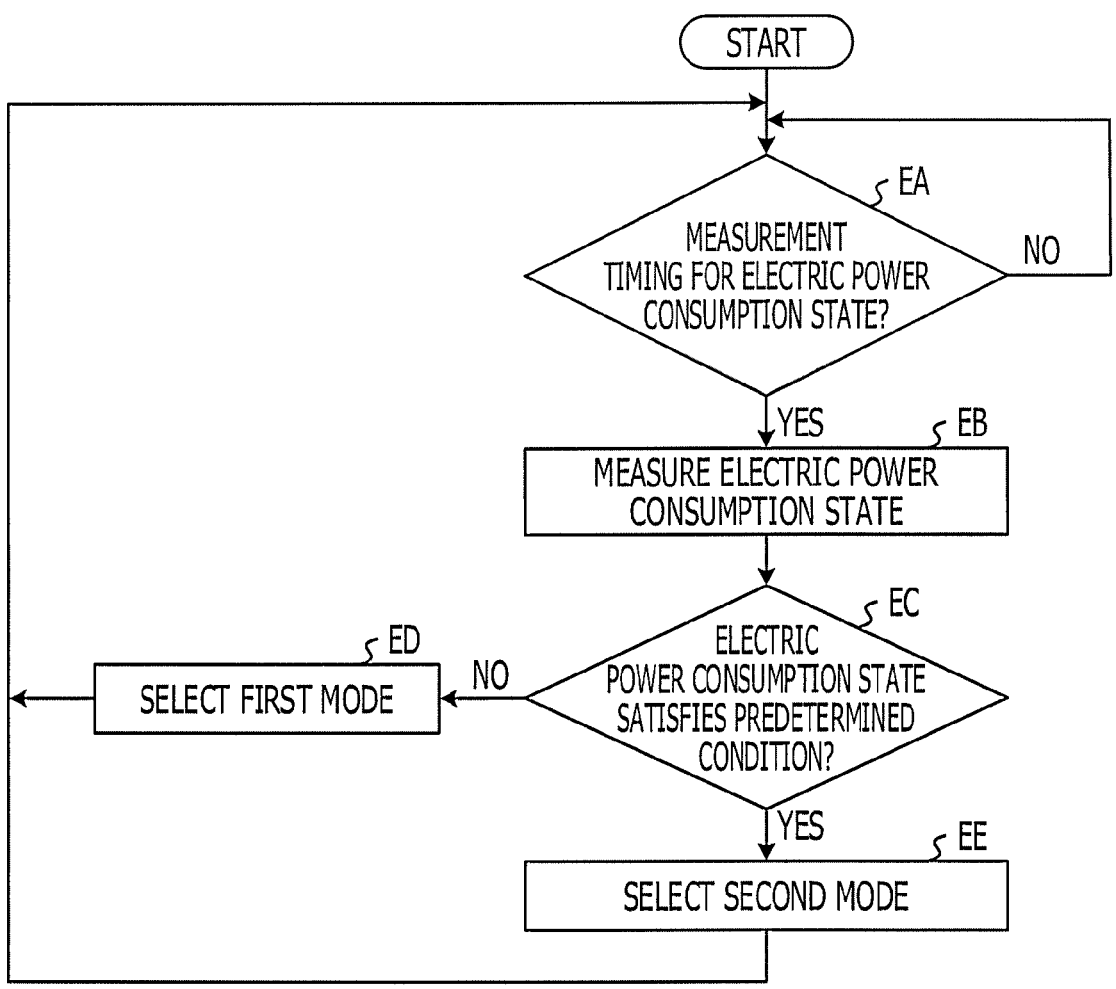
FIG. 14 is an explanatory drawing of a third example of an operation to determine the transmission mode for a Last Frame bit.

FIG. 14 is an explanatory drawing of a third example of an operation to determine the transmission mode for a Last Frame bit. In operation EA, the electric power consumption state measuring unit 14 determines whether or not the measurement timing for the electric power consumption state has arrived. In a case where the measurement timing has not arrived (operation EA: N), the operation returns to operation EA. In a case where the measurement timing has arrived (operation EA: Y), the operation advances to operation EB.

In operation EB, the electric power consumption state measuring unit 14 measures the electric power consumption state of the node 4-1. In operation EC, the determining unit 12 determines whether or not the electric power consumption state satisfies a predetermined condition. In a case where the electric power consumption state does not satisfy a predetermined condition (operation EC: N), the operation advances to operation ED. In a case where the electric power consumption state satisfies a predetermined condition (operation EC: Y), the operation advances to operation EE.

In operation ED, the determining unit 12 selects the first mode as the transmission mode for the Last Frame bit. Thereafter, the operation ends. In operation EE, the determining unit 12 selects the second mode as the transmission mode for the Last Frame bit. Thereafter, the operation ends.

According to the fourth embodiment, in accordance with the electric power consumption state, the second mode that consumes relatively large electric power and the first mode that consumes relatively small electric power may be switched. Therefore, the electric power consumption of the node 4-1 may be adjusted by switching the transmission modes for the Last Frame bit. For example, when the remaining battery capacity becomes small, the electric power consumption of the node 4-1 may be reduced to extend the drive time.

The fourth embodiment and the third embodiment may be combined with each other. For example, the determining unit 12 may select one of the first mode and the second mode in accordance with the combination of the condition on the link quality of the link between the hub 3 and the node 4-1 and the condition on the electric power consumption state of the node 4-1.

Figure 15:
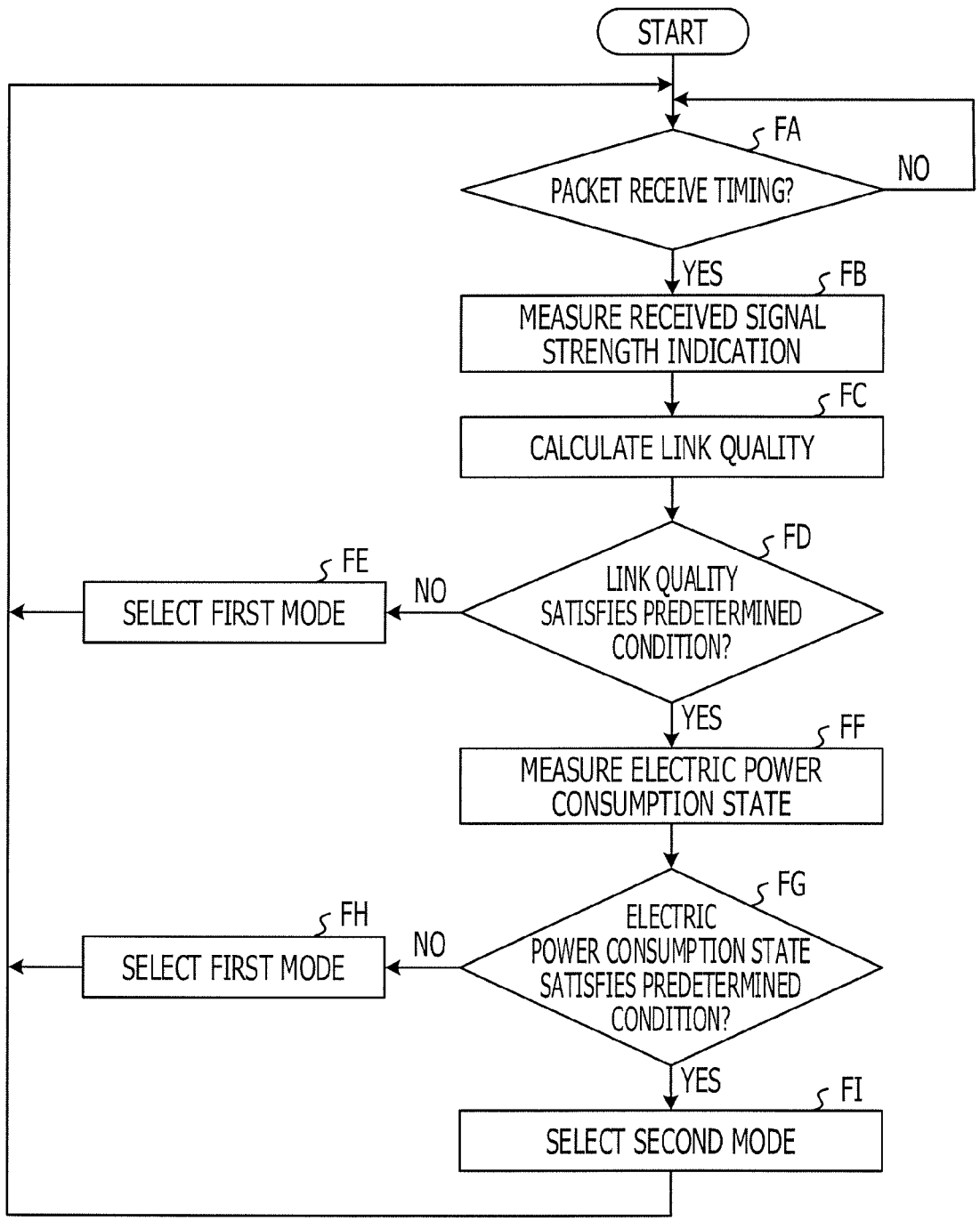
FIG. 15 is an explanatory drawing of a fourth example of an operation to determine the transmission mode for a Last Frame bit.

FIG. 15 is an explanatory drawing of a fourth example of an operation to determine the transmission mode for a Last Frame bit. Operations FA to FC are the same as the operations DA to DC illustrated as FIG. 11.

In operation FD, the determining unit 12 determines whether or not the link quality satisfies a predetermined condition. In a case where the link quality does not satisfy the predetermined condition (operation FD: N), the operation advances to operation FE. In a case where the link quality satisfies the predetermined condition (operation FD: Y), the operation advances to operation FF.

In operation FE, the determining unit 12 selects the first mode as the transmission mode for the Last Frame bit. Thereafter, the operation ends. Operations FF to FI are the same as the operations EB to EE illustrated as FIG. 14.

As illustrated as FIG. 12A, the increase in delay due to the communication state is smaller in the second mode than in the first mode. In addition, as illustrated as FIG. 12B, the electric power consumption is smaller in the first mode than in the second mode. Controlling the switching between the first mode and the second mode by using both the link quality and the electric power consumption state enables better and finer control of the balance between the amount of packet delay and the electric power consumption state.

Figure 16:
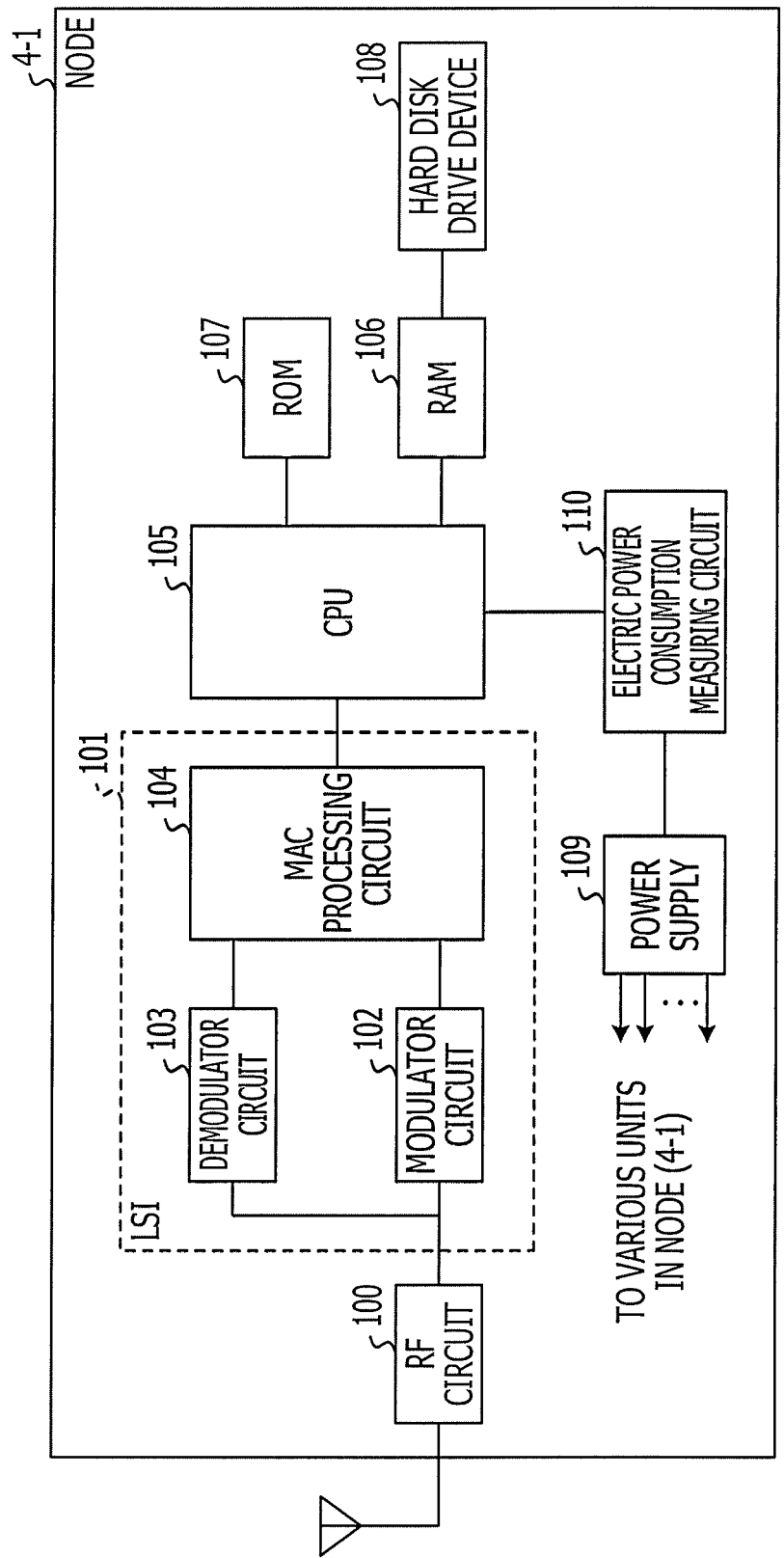
FIG. 16 illustrates an example of the hardware configuration of a node device.

Next, the hardware configuration of the node 4-1 will be described. FIG. 16 illustrates an example of the hardware configuration of the node 4-1. The node 4-1 includes a radio frequency circuit 100, a large scale integration (LSI) 101, a central processing unit (CPU) 105, and a random access memory (RAM) 106. The node 4-1 also includes a read only memory (ROM) 107, a hard disk drive device 108, a power supply 109, and an electric power consumption measuring circuit 110. In the attached drawings, the radio frequency circuit is sometimes written as "RF circuit".

The LSI 101 is a logic circuit that processes a digital baseband signal. The LSI 101 may include, for example, a modulator circuit 102, a demodulator circuit 103, and a media access control (MAC) processing circuit 104 each configured by an application specific integrated circuit (ASIC), a field-programming gate array (FPGA), or the like.

The power supply 109 is a battery that supplies electric power to various units of the node 4-1. The electric power consumption measuring circuit 110 measures the remaining battery capacity of the power supply 109. The electric power consumption measuring circuit 110 outputs the measurement results to the CPU 105.

The above-mentioned operation of the communication unit 10 may be executed by the radio frequency circuit 100, the modulator circuit 102, and the demodulator circuit 103. The above-mentioned operation of the data processing unit 11 may be executed by the MAC processing circuit 104. The operation of the determining unit 12 may be executed by the CPU 105. The above-mentioned operation of the link quality calculating unit 13 may be executed by the demodulator circuit 103 and the CPU 105. The above-mentioned operation of the electric power consumption state measuring unit 14 may be executed by the electric power consumption measuring circuit 110.

A computer program for causing the CPU 105 to execute the above-mentioned operations is stored in the ROM 107 and/or the hard disk drive device 108. The computer program may be installed into the hard disk drive device 108 by using an existing setup program or the like, from a computer-readable portable recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device comprising:
   a memory; and
   a processor coupled to the memory and configured to:
   create a first packet for transmission to an apparatus, the first packet storing last data to be transmitted in a contention-free period assigned to the communication device,
   create a second packet for transmission to the apparatus, based at least in part on a link quality of a link between the communication device and the apparatus:
   determine to which one of the first packet and the second packet first information is to be added, the first information being configured to indicate presence of remaining data to be transmitted in the contention-free period, and
   determine to which one of the first packet and the second packet second information is to be added, the second information being configured to indicate absence of remaining data to be transmitted in the contention-free period,
   transmit the first packet including at least one of the first information and the second information to the apparatus within the contention-free period, and
   transmit the second packet to the apparatus within the contention-free period and after the transmission of the first packet.

2. The communication device according to claim 1, wherein the processor is further configured to:
   add the second information to the second packet when the first information is added to the first packet, and
   add the first information to the second packet when the second information is added to the first packet.

3. The communication device according to claim 1, wherein the second packet is configured to include an empty payload that does not have data.

4. The communication device according to claim 1, wherein the link quality comprises one of received signal strength indication, signal-to-interference plus noise power ratio, bit error ratio, and packet error ratio on the link.

5. The communication device according to claim 1, wherein the link quality comprises a combination of at least two of received signal strength indication, signal-to-interference plus noise power ratio, bit error ratio, and packet error ratio on the link.

6. The communication device according to claim 1, wherein the processor is further configured to;
determine to which one of the first packet and the second packet the second information is to be added to, based on whether the link quality satisfies a predetermined condition, and
receive one of the link quality and the predetermined condition from another communication device.

7. The communication device according to claim 1, wherein the processor is further configured to determine to which one of the first packet and the second packet the second information is to be added, based on an electric power consumption level of the communication device.

8. The communication device according to claim 7, wherein the electric power consumption level comprises one of a remaining capacity of a battery that supplies operating electric power to the communication device, electric power consumption, and electric current consumption.

9. The communication device according to claim 1, wherein the processor is further configured to:
receive an instruction signal from another communication device, and
determine, based on the received instruction signal, to which one of the first packet and the second packet the second information is to be added, the instruction signal configured to instruct which one of the first packet and the second packet the second information is to be added to.

10. A communication method for a communication device in a network, the method comprising:
creating a first packet for transmission to an apparatus, the first packet storing last data to be transmitted in a contention-free period assigned to the communication device,
creating a second packet for transmission to the apparatus, based at least in part on a link quality of a link between the communication device and the apparatus;
determining to which one of the first packet and the second packet first information is to be added, the first information being configured to indicate presence of remaining data to be transmitted in the contention-free period, and
determining to which one of the first packet and the second packet second information is to be added, the second information being configured to indicate absence of remaining data to be transmitted in the contention-free period,
transmitting the first packet including at least one of the first information and the second information to the apparatus within the contention-free period, and
transmitting the second packet to the apparatus within the contention-free period and after the transmission of the first packet.

11. The communication method according to claim 10, wherein the second packet is transmitted after receiving a notification from the apparatus, and
wherein the notification indicates that the first packet has reached the apparatus.

12. The communication method according to claim 10, wherein the second packet includes an empty payload that does not have data.

13. The communication method according to claim 10, wherein determining to which one of the first packet and the second packet the first information or the second information is to be added is based on the link quality and a power consumption level of the communication device.

14. The communication method according to claim 10, wherein the network comprises a body area network (BAN).

15. The communication method according to claim 14, wherein the first information or the second information comprises a last frame bit.

16. The communication method according to claim 10, wherein the first information or the second information comprises a flag configured to indicate whether there is remaining data to be transmitted in the contention-free period assigned to the communication device.

17. The communication method according to claim 10, further comprising:
when the link quality is greater than or equal to a threshold, transmitting the first packet with the first information; and
when the link quality is less than the threshold, transmitting the first packet with the second information.

18. The communication method according to claim 17, wherein the threshold is determined based on a received signal quality having a predetermined packet delay.

19. The communication device according to claim 6, wherein the link quality is determined, at the another communication device, based on observations of delivery confirmation signals between the communication device to the apparatus.

20. The communication device according to claim 1, wherein information on the link quality is received from the apparatus.

21. A communication apparatus in a wireless network, the communication apparatus comprising:
a memory; and
a processor coupled to the memory and configured to:
transmit a first packet and a second packet to a device over a wireless link in a contention-free period assigned to the communication apparatus, the second packet being transmitted after transmission of the first packet; and
based on a link quality of the wireless link or a power consumption of the communication apparatus, select a first mode or a second mode for transmission of the first packet,
wherein in the first mode, the first packet is to be transmitted with a flag indicating that there is no remaining data to be transmitted in the contention-free period, and in the second mode, the first packet is to be transmitted with the flag indicating that there is more remaining data to be transmitted in the contention-free period.

22. The communication apparatus according to claim 21, wherein the processor is further configured to select, based on the link quality of the wireless link and the power consumption of the communication apparatus, the first mode or the second mode for the transmission of the first packet.

23. The communication apparatus according to claim 21, wherein the processor is further configured to:
select the first mode for transmission of the first packet, when the link quality of the wireless link is greater than or equal to a threshold, and
select the second mode for transmission of the first packet, when the link quality of the wireless link is less than the threshold.

24. The communication apparatus according to claim 23, wherein the threshold is determined based on a received signal quality having a predetermined packet delay.

* * * * *